(12) United States Patent
Archer et al.

(10) Patent No.: US 7,180,215 B2
(45) Date of Patent: Feb. 20, 2007

(54) MID SHIELD FOR AN ELECTRIC MOTOR

(75) Inventors: William A. Archer, Ft. Wayne, IN (US); Philip Wayne Johnson, Bluffton, IN (US); Scott A. Coonrod, Ft. Wayne, IN (US); Kamron Mark Wright, Ft. Wayne, IN (US); Donald E. Bair, Ft. Wayne, IN (US)

(73) Assignee: Regal-Beloit Corporation, Beloit, WI (US)

( * ) Notice: Subject to any disclaimer, the term of this patent is extended or adjusted under 35 U.S.C. 154(b) by 0 days.

(21) Appl. No.: 11/142,569

(22) Filed: May 31, 2005

(65) Prior Publication Data

US 2006/0267429 A1    Nov. 30, 2006

(51) Int. Cl.
*H02K 5/00* (2006.01)
(52) U.S. Cl. ......................................... 310/89; 310/90
(58) Field of Classification Search .................. 310/51, 310/71, 68 R, 89–90
See application file for complete search history.

(56) References Cited

U.S. PATENT DOCUMENTS

| | | | |
|---|---|---|---|
| 4,259,603 A * | 3/1981 | Uchiyama et al. ........ 310/68 B |
| 4,811,820 A * | 3/1989 | Rossi ........................ 188/71.6 |
| 5,004,942 A * | 4/1991 | King ............................ 310/89 |
| 5,127,148 A | 7/1992 | Lykes et al. | |
| 5,220,226 A | 6/1993 | Long et al. | |
| 5,497,039 A * | 3/1996 | Blaettner et al. ............. 310/51 |
| 5,929,545 A | 7/1999 | Fargo | |
| 6,559,566 B2 | 5/2003 | Modi et al. | |
| 6,674,198 B2 | 1/2004 | Gubbels | |
| 6,720,692 B2 | 4/2004 | Bell | |
| 6,859,992 B2 | 3/2005 | Gubbels | |

* cited by examiner

Primary Examiner—Thanh Lam
(74) Attorney, Agent, or Firm—Armstrong Teasdale LLP

(57) ABSTRACT

A motor is described that includes a motor enclosure, a motor-bearing assembly, a motor control unit, and a mid shield. The motor-bearing assembly is configured for placement within the motor enclosure, and a portion of the motor control unit is configured for placement within the motor enclosure. The mid shield is configured for placement within the motor enclosure between the motor control unit and the motor-bearing assembly. The mid shield is further configured to allow removal of the motor control unit without disturbance of the motor-bearing assembly.

15 Claims, 9 Drawing Sheets

MID SHIELD FOR AN ELECTRIC MOTOR

BACKGROUND OF THE INVENTION

This invention relates generally to electric motors and more particularly, to a mid shield assembly for electric motors and electronically commutated motors.

Known electronically commutated motors have a multi-stage winding assembly and a magnetic assembly associated for relative rotation. The winding stages of the multi-stage winding assembly have a preset energization sequence that includes at least one unenergized winding stage in which an induced back EMF appears. When integrated over time to a predetermined value, the induced back EMF indicates the instant at which the relative angular position between the multi-stage winding assembly and the magnetic assembly is suitable for the sequential commutation of the next winding stage.

The electronic circuitry for an electronically commutated motor generally includes a power circuit, a regulating circuit, and a control circuit. The power circuit has solid state switching devices for commutating the power supplied to the electronically commutated motor to effect its energization. The regulating circuit includes various solid state components for maintaining the power supplied to the electronically commutated motor generally constant. The control circuit, sometimes referred to as a control unit, has various solid state components for controlling the conductivity of the switching devices.

Some of the solid state components for an electronically commutated motor, e.g., transistors, need to be relatively large to accommodate the currents that must pass through them. Large transistors can produce a sizable amount of heat that should be dissipated in order to keep the transistors functioning properly. It is well known in the art that to promote heat dissipation, the electronic circuitry for an electronically commutated motor can be attached to a heat sink and positioned adjacent an outer surface of an end shield of the motor. However, this increases costs since another compartment is needed to protect the electronic circuitry. Also complexity is increased when servicing such motors because removal of the end shield generally means that the windings and rotating shaft of such motors are free to move about the motor enclosure.

BRIEF DESCRIPTION OF THE INVENTION

In one aspect, a motor is provided. The motor comprises a motor enclosure, a motor-bearing assembly configured for placement within the motor enclosure, and a motor control unit, a portion of which is configured for placement within the motor enclosure. The motor also comprises a mid shield. The mid shield is configured for placement within the motor enclosure between the motor control unit and the motor-bearing assembly. The mid shield is further configured to allow removal of the motor control unit without disturbance of the motor-bearing assembly.

In another aspect, a method of assembling a motor is provided where the motor includes a motor enclosure, a motor-bearing assembly, a mid shield, and a motor control unit. The method comprises forming a plurality of shield alignment indentations into an interior perimeter of the motor enclosure, inserting the motor-bearing assembly into the motor enclosure, inserting the mid shield into the motor enclosure, enclosure engaging members of the mid shield coming to rest on the shield alignment indentations, and inserting at least a portion of the motor control unit into the motor enclosure. The mid shield is positioned between the motor-bearing assembly and the motor control unit.

In still another aspect, a mid shield for a motor is provided. The mid shield is configured for placement within a motor enclosure of the motor between a motor control unit and a motor-bearing assembly. The mid shield comprises at least one enclosure engaging member configured to locate the mid shield such that the motor control unit is removal from the motor enclosure without disturbance of the motor-bearing assembly.

DETAILED DESCRIPTION OF THE INVENTION

Figure 1:
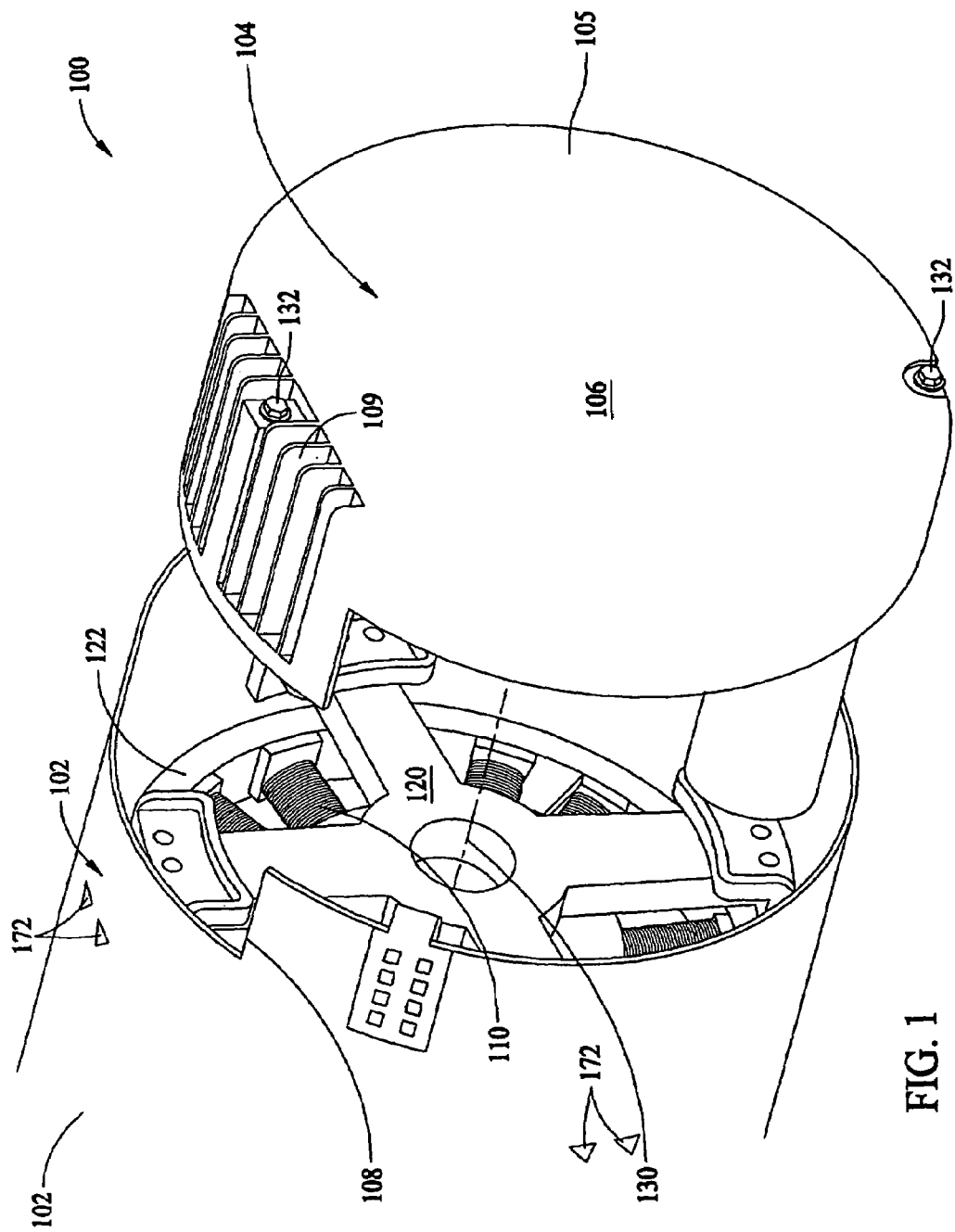
FIG. 1 is an exploded end view of an electronically commutated motor (ECM) incorporating a mid shield.

FIG. 1 is an exploded end view of an electronically commutated motor 100. Motor 100 includes a motor enclosure 102 and a motor control unit 104 configured for attachment to motor enclosure 102. A chassis 105 of motor control unit 104 serves as an end shield 106 for motor 100. Motor enclosure 102 also includes a slot 108 which engages a heat sink 109 formed in chassis 105 as further described below. While motor control unit 104 includes chassis 105, motor 100 is configured such that motor enclosure 102 provides substantially all of the enclosure for motor control unit 104. Within motor enclosure 102 are windings 110 of motor 100 and a mid shield 120 configured for placement between windings 110 and motor control unit 104. As further described herein, mid shield 120 is sometimes referred to as an X-shaped mid shield.

The placement and configuration of mid shield 120 allows motor control unit 104 of motor 100 to be removed and replaced without disruption or displacement of a motor winding assembly 122 which includes windings 110 of motor 100. As illustrated, motor enclosure 102 is configured to form a part of the enclosure for motor control unit 104, along with end shield 106, allowing for a one-piece enclosure configuration. Mid shield 120 is also configured to meet any airflow, voltage clearances and assembly height limitations imposed on motor 100.

In one embodiment, as illustrated, mid shield 120 fits precisely with respect to a centerline 130 of motor 100 and further aligns with two bolts 132 that pass through end shield 106 of motor control unit 104 to clamp and secure mid shield 120 and motor control unit 104 within motor enclosure 102. This alignment and symmetry remain even when chassis 105 containing the electronics of motor control unit 104 is removed. Retaining the alignment and symmetry within enclosure 102 is important as it lowers a replacement cost of motor control unit 104 in the field. Mid shield 120 also contributes to a lower material cost for motor 100, because with mid shield 120, motor enclosure 102 is utilized as a part of the containment enclosure for portions of motor control unit 104 as shown in FIG. 1. In one embodiment, motor enclosure 102 is fabricated from steel as compared to the cast aluminum of chassis 105 thereby lowering overall costs of motor 100.

Utilization of mid shield 120 allows motor control unit 104 to be removed from enclosure 102 without disturbing the rest of the motor assembly, for example, windings 110. The non-disturbance is obtained by using mid shield 120 to secure a bearing that engages a motor shaft (neither shown in FIG. 1) of motor 100. Therefore, enclosure 102 is additionally configured to provide any required clearances for the electrical components (e.g., motor control unit 104) of motor 100 to allow disengagement of motor control unit 104 from motor 100.

Figure 2:
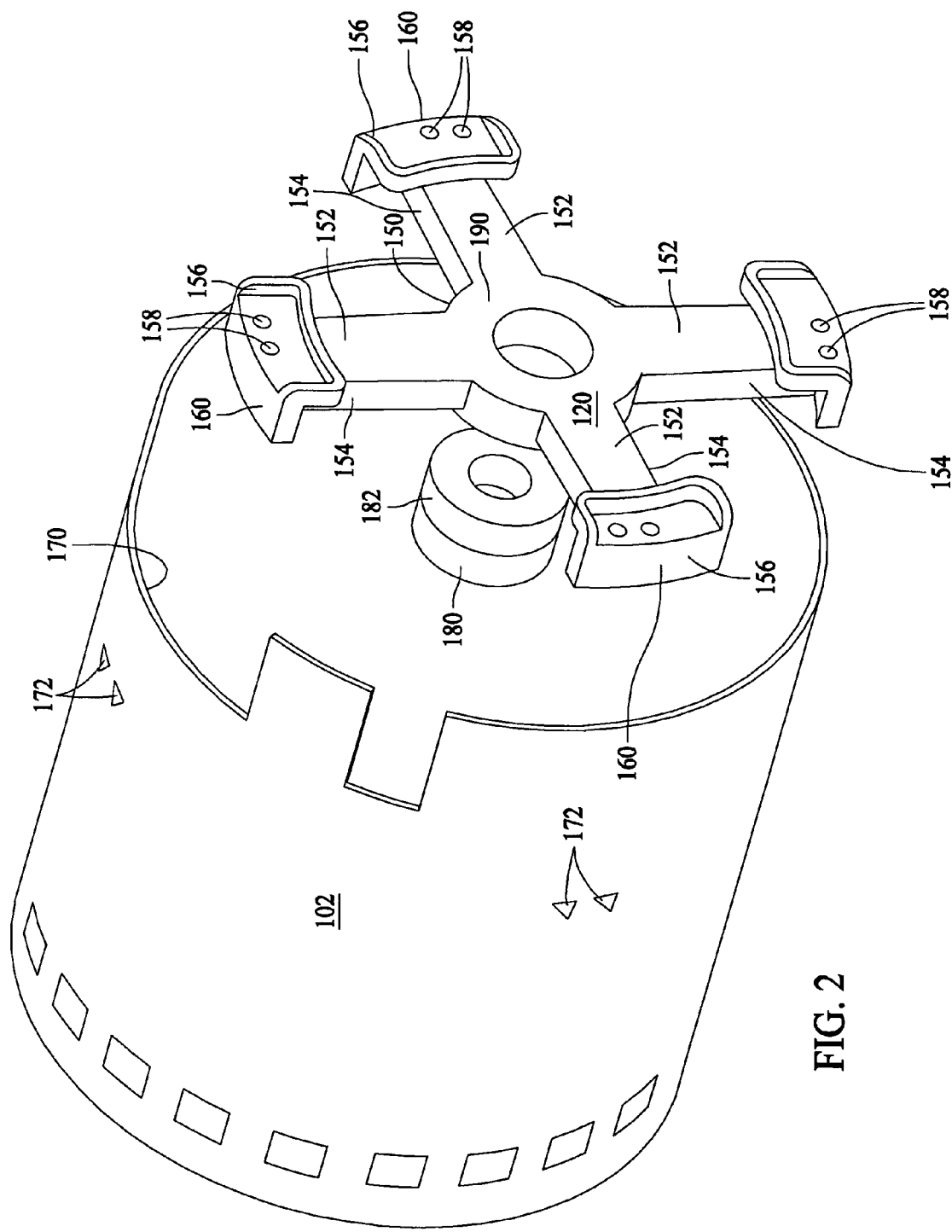
FIG. 2 illustrates a mid shield removed from a motor enclosure.

FIG. 2 is an illustration of mid shield 120 removed from motor enclosure 102. In one embodiment, mid shield 120 has an overall "X" shape and includes a circular center section 150 and four leg portions 152. In the embodiment, leg portions extend from center section 150 with an approximate 90 degree separation between each leg portion 152 which results in the above described "X" shape. In an alternative embodiment, the degree of separation between adjacent leg portions 152 is dependent on the space required for components to extend through that space. At an end 154 opposite center section 150 each leg portion 152 includes an enclosure engaging member 156 with shield alignment bores 158 formed there through. An end portion 160 of enclosure engaging member 156 is fabricated with a curvature or radius to provide a close fit with an interior perimeter 170 of enclosure 102 when mid shield 120 is inserted therein.

As shown, enclosure 102 is formed with shield alignment protrusions 172 extending into motor enclosure 102 to provide an engagement area for mid shield 120 upon insertion into motor enclosure 102. In one embodiment, connecting members, preferably screws or bolts, for example bolts similar to bolts 132 (shown in FIG. 1), pass through motor winding assembly 122 (shown in FIG. 1) and threadingly engage shield alignment bores 158. While in one embodiment, motor winding assembly 122 is press fit into motor enclosure 102, bolts 132 pass through motor winding assembly to retain mid shield 120) in a specific position with respect to motor enclosure 102. In addition, the engagement of these connecting members pulls mid shield 120 up against protrusions 172 such that mid shield 120 retains its position and alignment with respect to motor enclosure 102.

Also illustrated in FIG. 2 are a bearing 180 and a washer 182 configured to be seated within mid shield 120 and engage a shaft (not shown in FIG. 2) of motor 100 as further described below.

Figure 3:
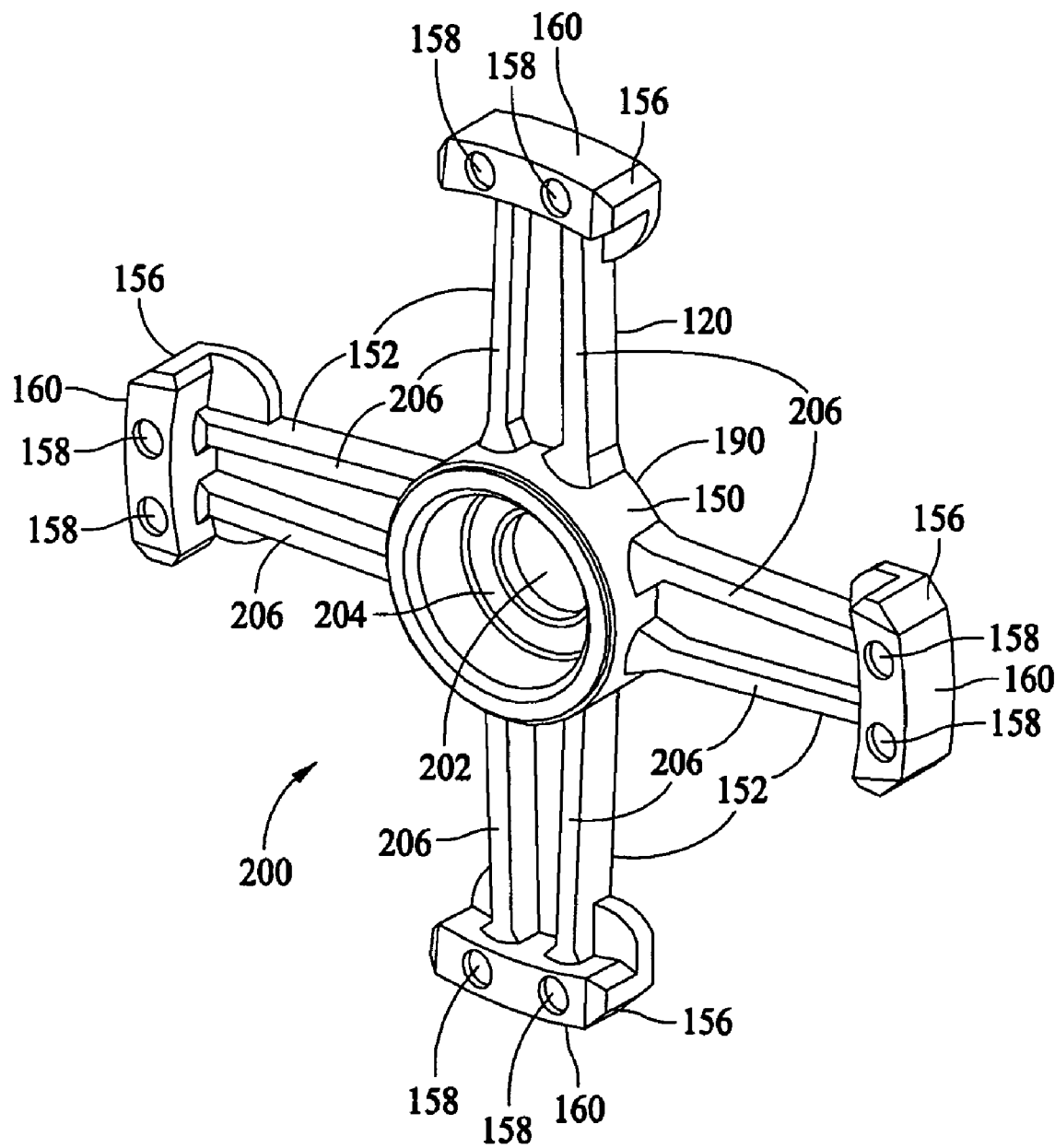
FIG. 3 is a plan view of a motor shaft engaging side of the mid shield shown in FIG. 2.

Mid shield 120 is configured with two distinct sides, a motor control unit engaging side 190 as shown in FIG. 2 and a motor shaft engaging side 200 which is shown in FIG. 3. Specifically, FIG. 3 is an illustration of a motor shaft engaging side 200 of mid shield 120. Center section 150 includes a shaft bore 202 and a concentric bearing bore 204. Shaft bore 202 is deeper than bearing bore 204 and has a smaller diameter than bearing bore 204. A shaft (not shown in FIG. 3) of motor 100 (shown in FIG. 1) engages shaft bore 202 and also passes through a bearing (not shown in FIG. 3) that is seated within bearing bore 204 when mid shield 120 is installed within motor enclosure 102. In one embodiment, mid shield 120 is fabricated from an aluminum-tin-nickel alloy and includes reinforcement ribs 206 extending along leg portions 154 between center section 150 and enclosure engaging member 156.

Each enclosure engaging member 156 includes two shield alignment bores extending there through. A perimeter defining bores 158 of each member 156 is threaded. A first bore 158 is utilized to threadingly engage a connecting member that passes through chassis 105 of motor control unit 104 to retain motor control unit in position. A second bore 158 of each member 156 includes a perimeter that is similarly threaded to engage a connecting member (e.g., a bolt) that passes through motor winding assembly 122 (partially shown in FIG. 1) to retain mid shield 120 in position with respect to motor enclosure 102.

Figure 4:
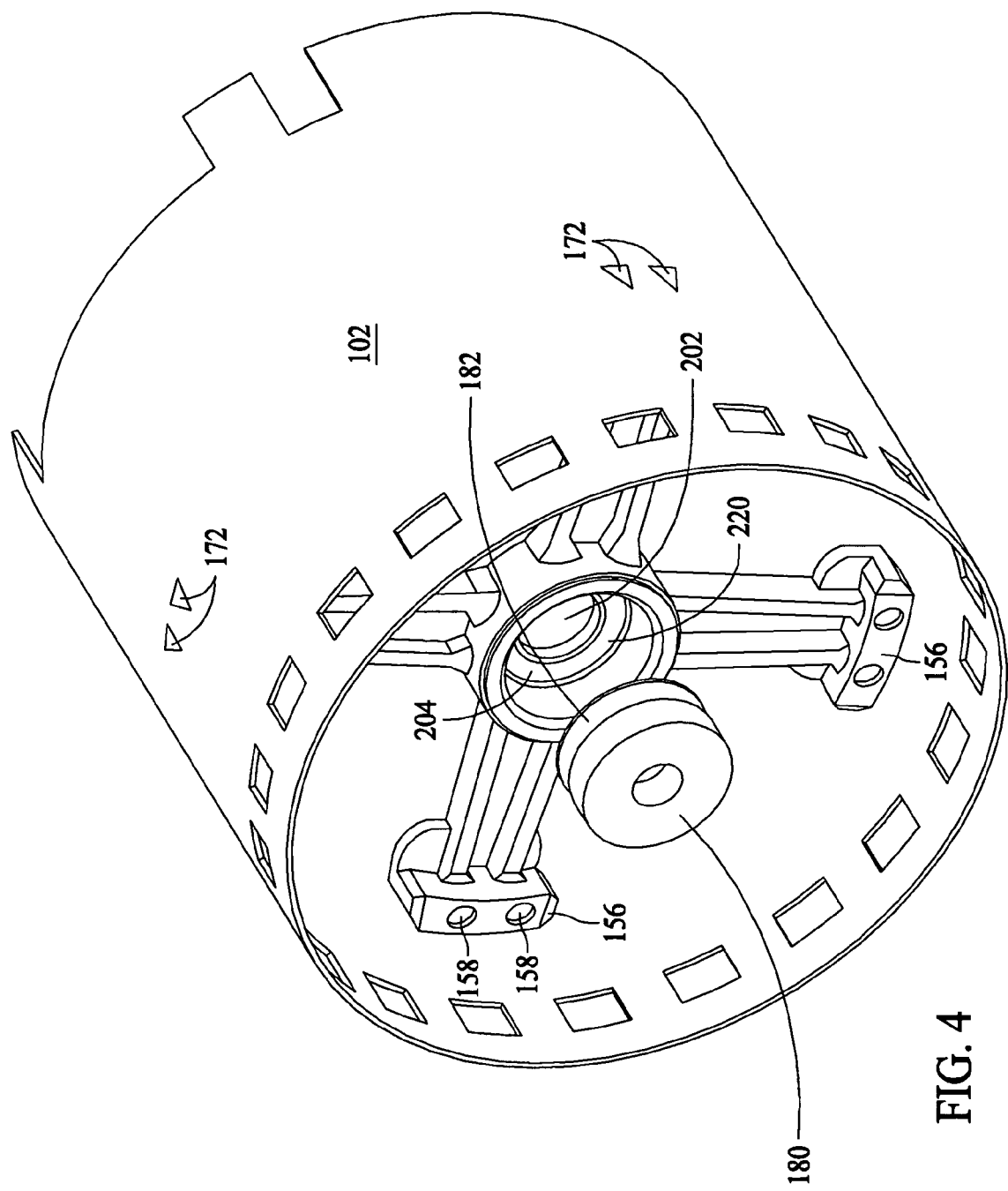
FIG. 4 is a plan view of a motor enclosure illustrating the mid shield shown in FIG. 2 engaged within the enclosure.

FIG. 4 is an end view of motor enclosure 102 showing bearing 180 and washer 182 in an exploded configuration with respect to bore 204 of mid shield 120. FIG. 4 also illustrates engagement between enclosure engaging member 156 and shield alignment protrusions 172 when mid shield 120 is installed within motor enclosure 102. With regard to shield alignment protrusions 172, they accurately locate mid shield 120 in relation to four motor bolts (connecting members) and a centerline of motor 100.

Bearing bore 204 provides an accurate and rigid support for motor bearing 180. Bearing 180, when placed in bearing bore 204, is configured to accept one end of a motor shaft, and in one embodiment, is a ball bearing. Mid shield 120 provides the rigid support for bearing 180, while still allowing airflow through motor 100. A portion of bearing bore 204 includes a precision-machined pocket 220 configured to mate with bearing 180 along its centerline in a precise manner to prevent misalignment. In one embodiment, washer 182 is installed between bearing 180 and mid shield 120 such that washer 182 and bearing 180 engage bearing bore 204, and subsequently pocket 220. Washer 182 provides preload necessary for proper operation of bearing 180.

Figure 5:
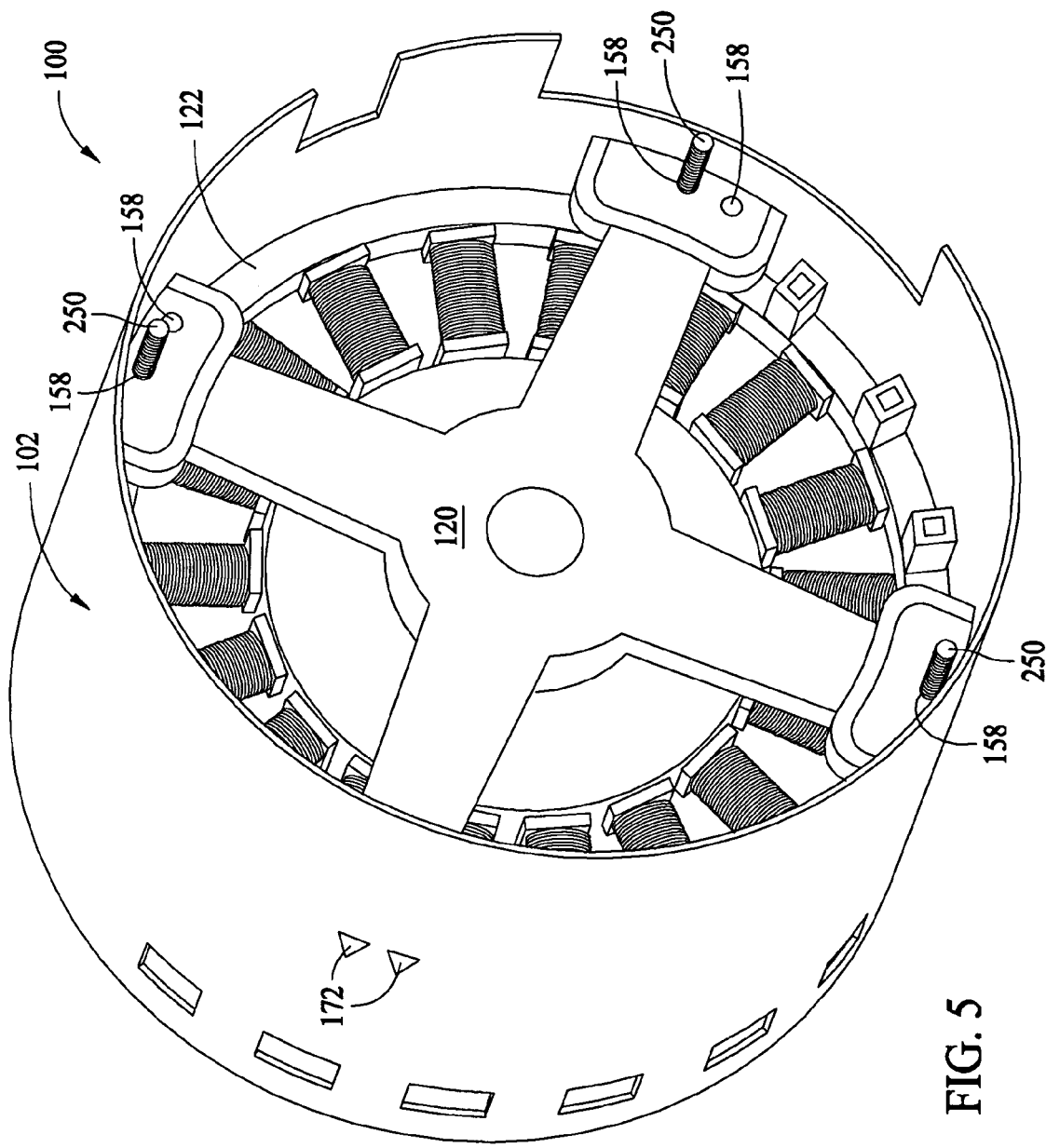
FIG. 5 is a motor control unit end view illustration of the motor enclosure shown in FIG. 1.

FIG. 5 is another substantial motor control unit end view illustration of motor 100. As illustrated, mid shield 120 is positioned against protrusions 172 in motor enclosure 102, and motor winding assembly 122 has been inserted into motor enclosure 102. Mid shield 120 is held in place by connecting members (e.g., bolts) that have been inserted through motor winding assembly 122 and threaded into mid shield 120. An end of these bolts is shown extending slightly through respective shield alignment bores 158 of mid shield 120. In an alternative embodiment, a nut may be utilized to engage the bolts as they pass through shield alignment bores 158. In either embodiment, engagement of the connecting members with mid shield 120 causes a force to be applied to mid shield 120 such that it is in firm engagement with protrusions 172 of motor enclosure 102 thereby maintaining a position of both mid shield 120 and motor winding assembly 122 with respect to motor enclosure 102.

Figure 6:
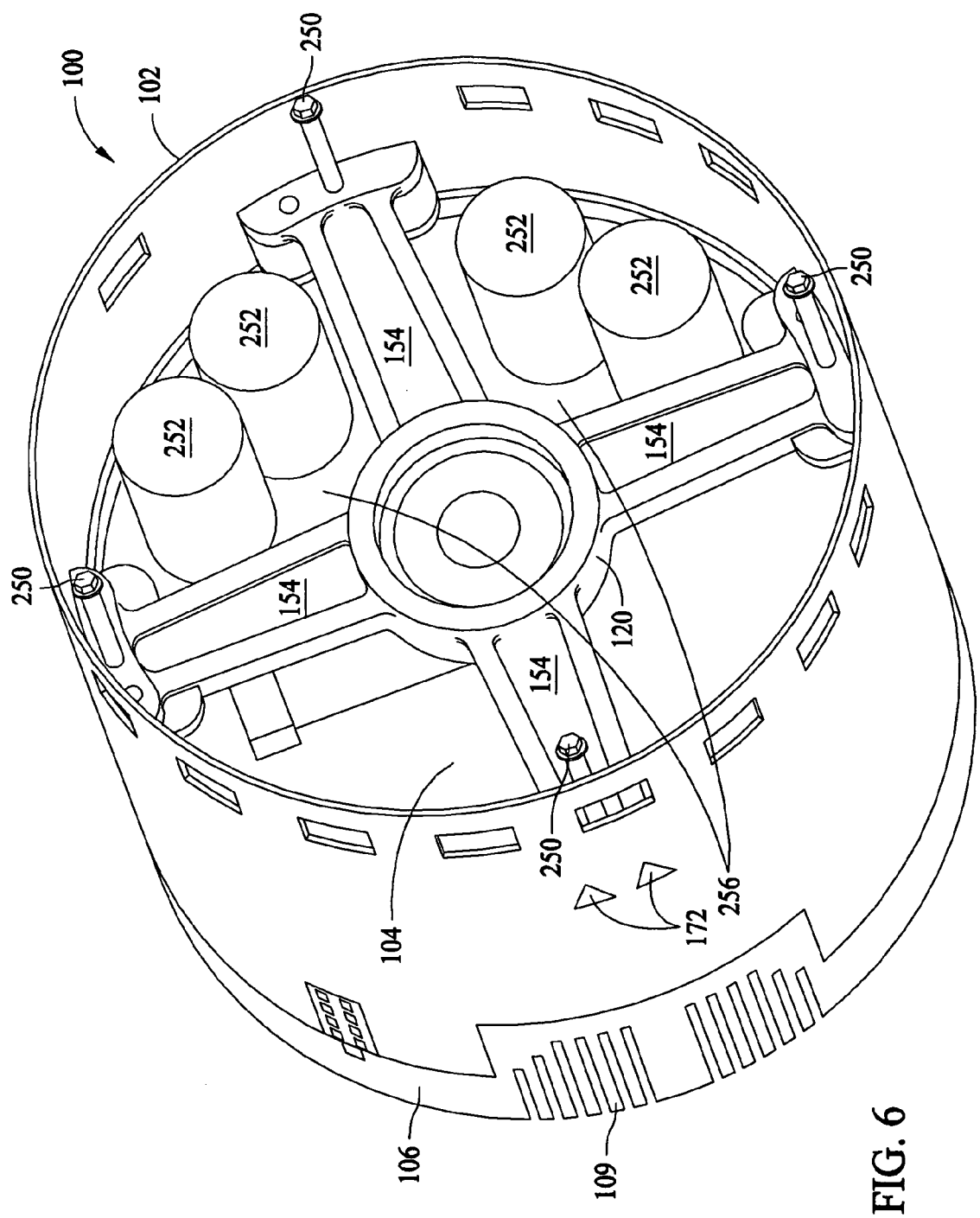
FIG. 6 is a motor winding assembly end view illustration of the motor enclosure shown in FIG. 1.

FIG. 6 is a motor winding assembly end view of motor 100 with motor winding assembly 122 removed. Though motor winding assembly 122 is not shown in FIG. 6, connecting members 250 that normally would pass through motor winding assembly 122 are shown. It is easily discerned how the operation of inserting connecting members 250 through a motor winding assembly would cause mid shield 120 to more firmly engage protrusions 172 of motor enclosure 102. Motor control assembly 104 is positioned within motor enclosure 102 Together, FIGS. 5 and 6 illustrate positioning of mid shield 120 with respect to each of motor control unit 104 and motor winding assembly 122.

FIGS. 5 and 6 also show how mid shield 120 provides separation between both motor control unit 104 and motor winding assembly 122 and retention for motor control unit 104 within motor enclosure 102. As described above, connecting members (e.g. bolts 132 shown in FIG. 1) pass through chassis 105 of motor control unit 104, avoiding the components of motor control unit 104. The connecting members 152 then engage the threads formed in the perimeters defined by respective shield alignment bores of mid shield 120. As a result mid shield 120 provides a mechanism for motor control unit 104 to retain its respective position within motor enclosure 102 while also providing separation between the motor control unit 104 and motor winding assembly 122.

In addition, mid shield 120, as described above, mates internally to motor enclosure 102 and helps to maintain an overall height requirement for motor 100. Specifically, mid shield 120 fits precisely within motor enclosure 102 and aligns with four connecting members 250 (e.g. bolts) to clamp and secure the mid shield of motor 100. Further, capacitors 252 extend from control unit 104. Mid shield 120 is further configured to allow capacitors 252 to extend at least partially into a space 256 between leg portions 152 of mid shield 120 to achieve a shortened length for motor 100.

The described spaces 256 in mid shield 120 are important as circuit board space in motor control unit 104 is limited. The limited space typically results in smaller diameter capacitors being incorporated onto such a circuit board. To provide the desired capacitance values, the smaller diameter capacitors are made taller. To maintain, or reduce, a length of motor 100, the described configuration of mid shield 120 allows these taller capacitors 252 to extend into, and in some embodiments through, spaces 256. In known ECM configurations, the motor control unit is sealed, therefore an increase in capacitor height resulted in an increase of the height of the motor control unit, and therefore the motor.

In one embodiment, mid shield 120 is rigid as it is cast utilizing an aluminum-tin-nickel alloy as described above. The removed material between the leg portions 154 lightens mid shield 120, provides a space for capacitors 252 of motor control unit 104 to shorten an overall length of motor 100, and saves on cost of material. In one embodiment, though capacitors 252 extend into spaces 256, there remains enough clearance between these capacitors 252 and motor winding assembly 122 such that motor 100 meets Domestic and European safety agency standards spacing requirements. In one embodiment, capacitors 252 only extend into two of spaces 256. The remaining spaces 256, therefore allow airflow from the rotating portions of motor winding assembly 122 to pass through motor control unit 104, thereby providing cooling to the electronic components of motor control unit 104. In addition, even in spaces 256 into which capacitors 252 extend, air flows around capacitors 252 thus also providing cooling to the components of control unit 104.

Figure 7:
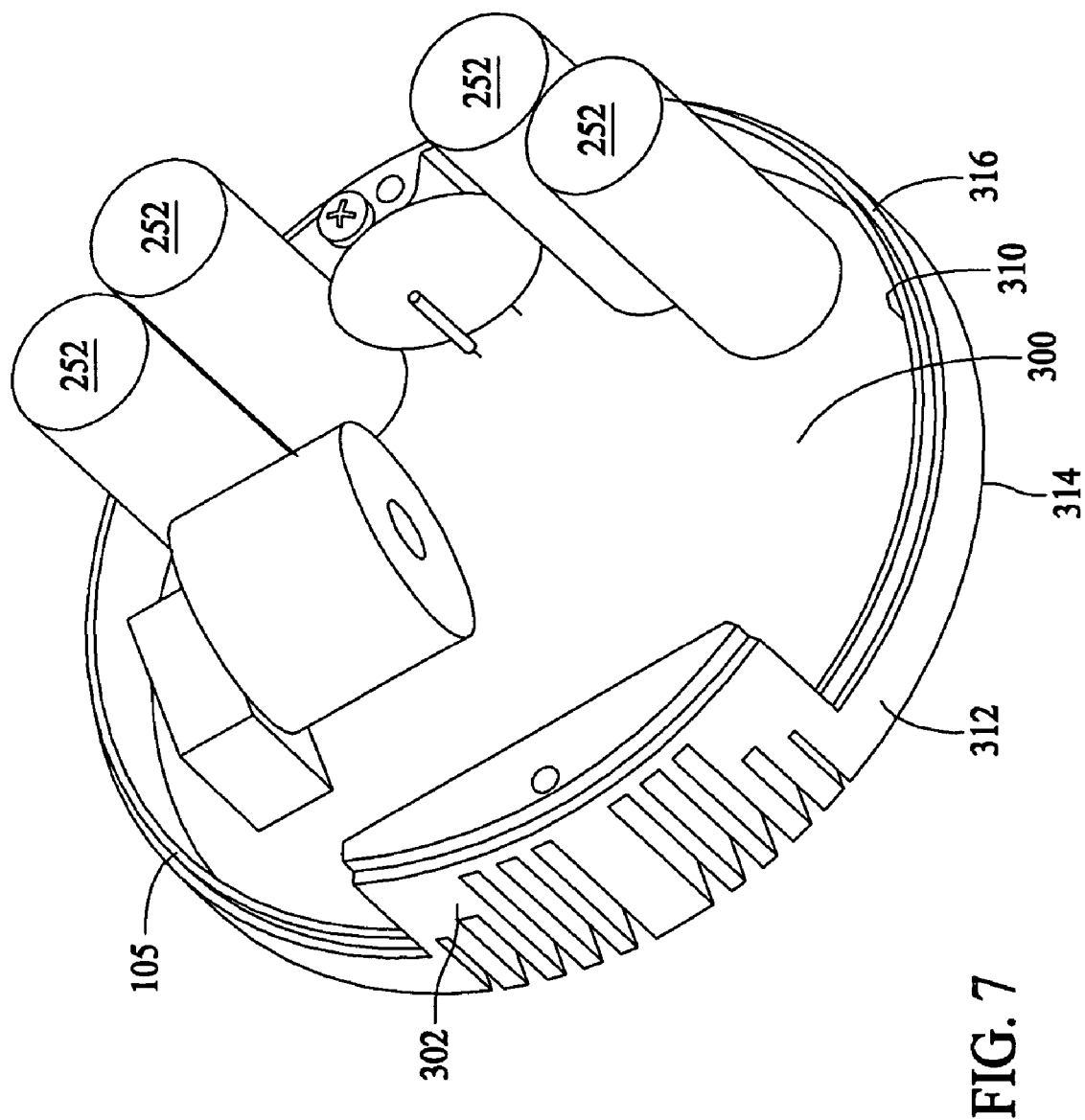
FIG. 7 is a component side perspective view of a motor control unit.

FIG. 7 is a component side view of motor control unit 104 which further illustrates a portion of the components of motor control unit 104 including capacitors 252. A height of capacitors 252, as compared to the other components, is easily discerned as is their extending into spaces 256 created by the configuration of mid shield 120. The components are mounted within chassis 105, in one embodiment, on a circuit board (not shown) that has been covered by a potting material 300 after the components are attached thereto. The potting material 300 protects components on the circuit board, most of which cannot be seen in FIG. 7. Potting material 300 also provides support for the circuit board. At least one insulator (not shown) serves to insulate electrical connections on the circuit board from chassis 105.

Chassis 105, in one embodiment, has a heat sink 302 formed therein that, in one embodiment, is configured to engage an end of motor enclosure 102. Chassis 105 has a substantial cup shape which configures chassis 105 to contain a potting material 300 utilized to encapsulate the components, a plurality of which are mounted on the circuit board, of motor control unit 104 as described above.

As seen in FIG. 7, chassis 105 includes an inner sleeve 310 that forms a portion of a perimeter ring 312 that extending a base 314 of chassis 105. Inner sleeve 310 is configured to fit inside a perimeter of motor enclosure 102. As inner sleeve is inserted into motor enclosure 102 a lip 316 of perimeter ring 312 engages the end of motor enclosure 102. As shown, perimeter ring 312, inner sleeve 310 and lip 316 extend to heat sink 302 which engages slot 108 in motor enclosure 102 in the same manner.

Figure 8:
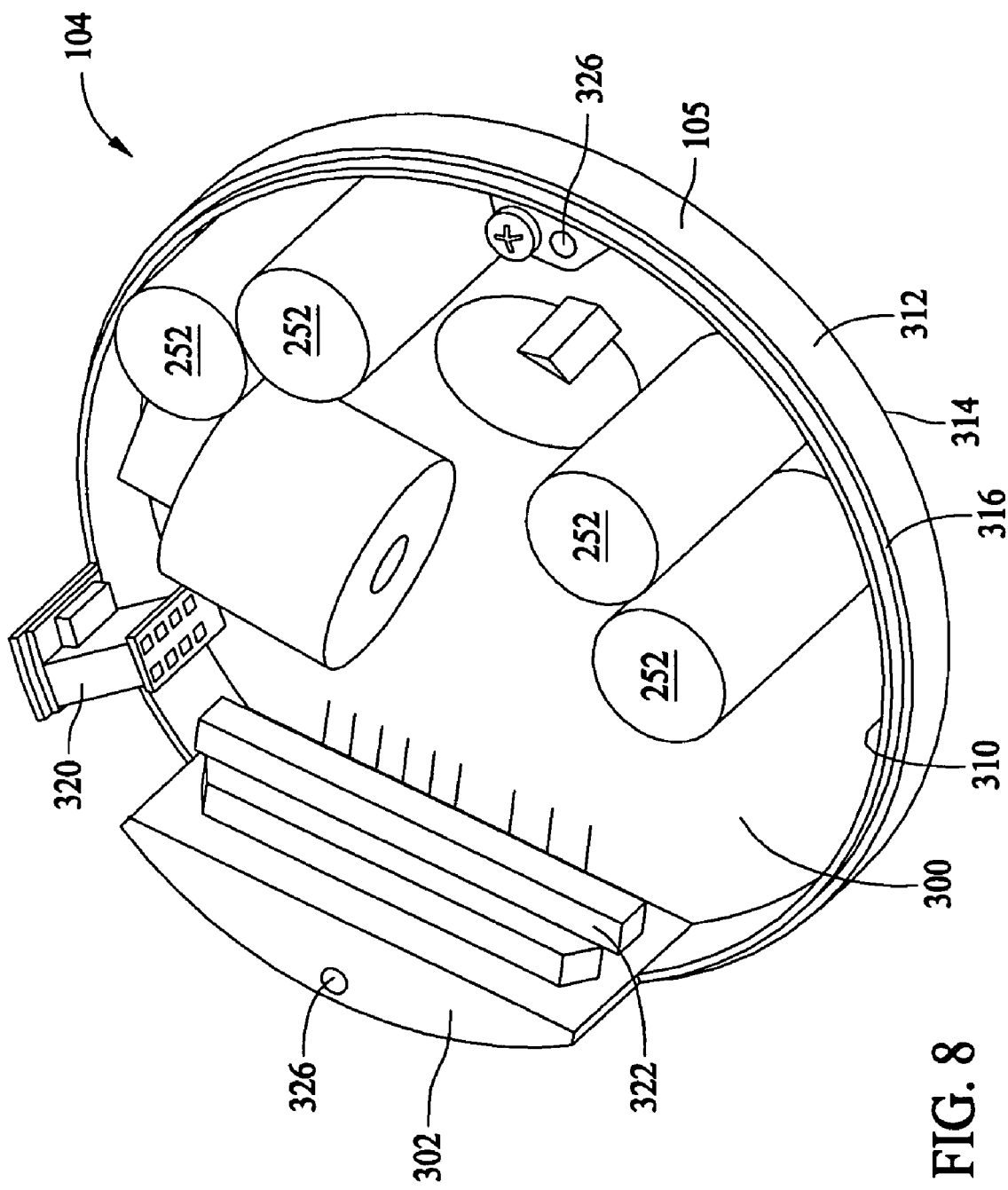
FIG. 8 is another perspective view of the motor control unit shown in FIG. 7 illustrating connections to a heat sink.
Figure 9:
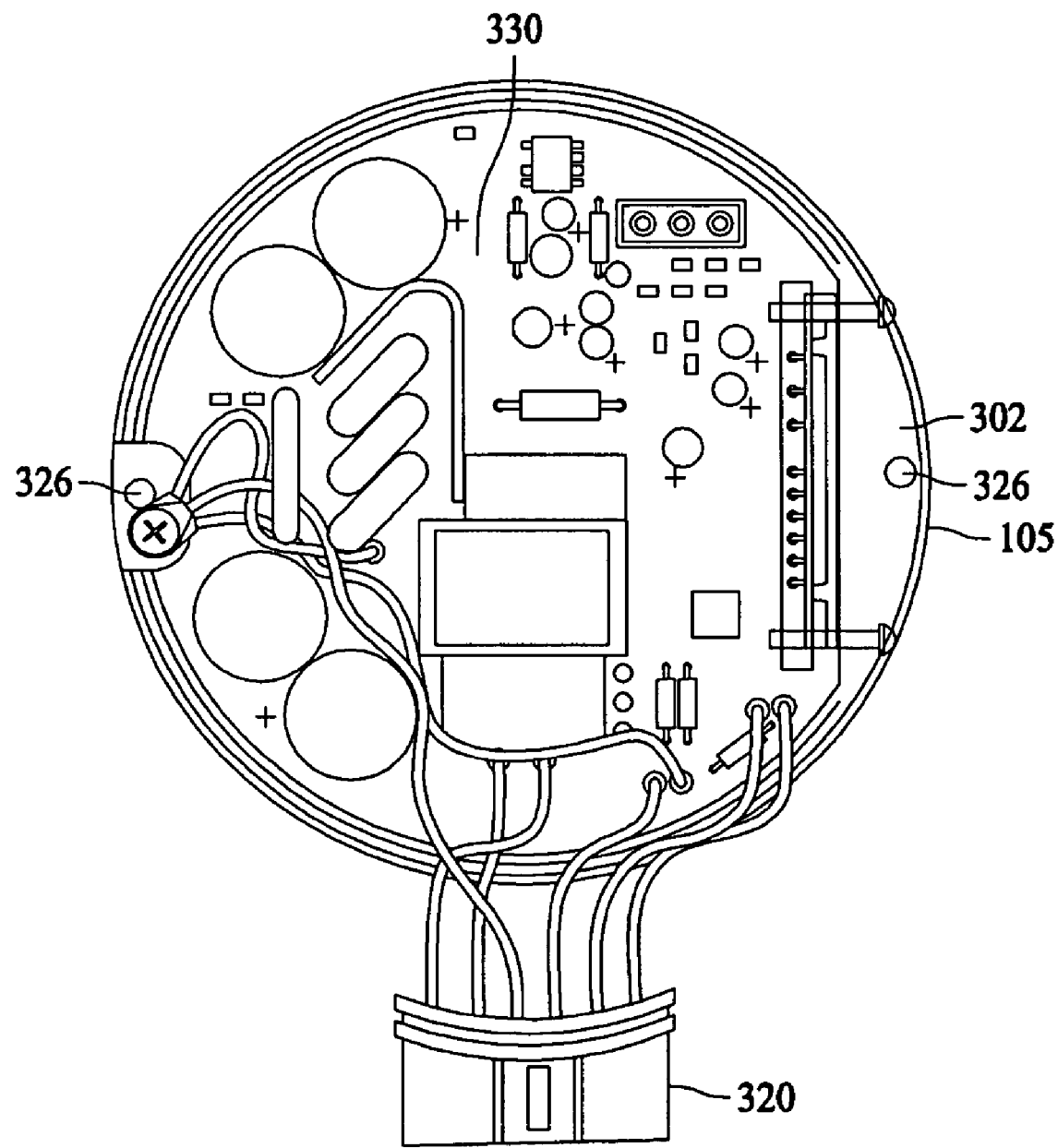
FIG. 9 is an end view of the chassis of the motor control unit with an example circuit board and components mounted thereon.

FIG. 8 is another component side view of motor control unit 104 illustrating an electrical connector 320 and a component 322 connected to heat sink 302. In one embodiment, electrical connector 320 is configured to engage a slot in motor enclosure 302 and perimeter ring 312. Holes, or bores 326, in chassis 105 allow connecting members (not shown in FIG. 8) to pass through such that they may engage mid shield 120, and align chassis 105, mid shield 120, and motor enclosure 102 as described above. FIG. 9 is an end view of chassis 105 with an example circuit board 330 having components mounted thereon before potting material 300 is added. FIG. 9 further shows electrical connections from circuit board 300 to electrical connector 320 before potting.

Therefore mid shield 120, as described herein, is configured to integrate much more with the control electronics of control unit 104 and allows airflow, electrical clearances and reduction in cost goals to be achieved as compared to previous ECM end shield designs. For example, previous end shields have been attached to the motor enclosure and have utilized rabbet cuts and tapped holes in the face of the end shield to allow a motor control unit to be bolted thereto. As such the motor control units are substantially separate from the motor enclosure and in many ways are two separate and distinct units that are only slightly integrated with one another.

Incorporation of mid shield 120 within motor enclosure 102 allows motor enclosure 102 to be utilized as the enclosure for both motor winding assembly 122 (shown in FIG. 1) and motor control unit 104 and provides for an integrated motor 100. As such, mid shield 120 lowers replacement costs of motor control units 104 in the field, and are easily replaceable within motor enclosures 102 as compared to motors that incorporate known end shields and the above described externally attached motor control units. Finally, mid shield 120 lowers production costs of ECM 100 as motor control unit 104 is contained within motor enclosure 102. The costs are lowered motor enclosure 102 is typically fabricated from steel and chassis 105 is cast aluminum. Whereas known ECMs utilize a steel motor enclosure, a cast aluminum end shield, and an external cast enclosure for the motor control unit.

While the mid shield described herein is described in the context of an electronically commutated motor (ECM), the disclosure should not be construed as being so limited. The mid shield concept described herein is equally applicable to any motor, for example, variable speed induction motors and switched reluctance motors where the housing of components other than a motor winding assembly (e.g., a controller or switches) within a single motor enclosure enclosing an end space is desirable.

While the invention has been described in terms of various specific embodiments, those skilled in the art will recognize that the invention can be practiced with modification within the spirit and scope of the claims.

What is claimed is:

1. A motor comprising:
   a motor enclosure;
   a motor-bearing assembly configured for placement within said motor enclosure;
   a motor control unit, a portion of said motor control unit configured for placement within said motor enclosure; and
   a mid shield comprising a circular center section, a plurality of leg portions extending outward from said center section, each said leg portion having an end opposite said center section, and an enclosure engaging member at each said end of said leg portions, said mid shield configured for placement within said motor enclosure between said motor control unit and said motor-bearing assembly, said mid shield further configured to allow removal of said motor control unit without disturbance of said motor-bearing assembly.

2. A motor according to claim 1 wherein said mid shield comprises four said leg portions.

3. A motor according to claim 1 wherein said motor enclosure comprises a plurality of shield alignment indentations, said indentations configured to engage said enclosure engaging members upon insertion into said motor enclosure.

4. A motor according to claim 1 wherein said motor comprises a plurality of connecting members, said enclosure engaging members each comprise at least one shield alignment bore formed therethrough, said connecting members configured to extend through said shield alignment bores.

5. A motor according to claim 1 wherein said enclosure engaging members each comprise an end portion having a curvature configured to provide a close fit with an interior perimeter of said motor enclosure when said mid shield is inserted therein.

6. A motor according to claim 1 wherein said leg portions each comprise at least one reinforcement rib extending between said center section and a respective said enclosure engaging member.

7. A motor according to claim 1 wherein said center section comprises:
   a bearing bore substantially centered within said center section and extending partially therethrough; and
   a shaft bore concentric with and extending further therethrough than said bearing bore.

8. A motor according to claim 1 wherein said motor enclosure is configured such that a portion of said motor enclosure is configured to provide enclosure for a portion of said motor control unit.

9. A motor according to claim 1 wherein said mid shield is fabricated from an aluminum-tin-nickel alloy.

10. A mid shield configured for placement within a motor enclosure of a motor between a motor control unit and a motor-bearing assembly, said mid shield comprising a circular center section, a plurality of leg portions extending outward from said center section, each said leg portion having an end opposite said center section, said mid shield further comprising at least one enclosure engaging member at said end of at least one of said leg portions, said enclosure engaging member configured to locate said mid shield such that the motor control unit is removable from the motor enclosure without disturbance of the motor-bearing assembly.

11. A mid shield according to claim 10 further comprising
   one of said enclosure engaging members at each said end of said leg portions, said enclosure engaging members configured to engage shield alignment protrusions within the motor enclosure upon insertion into the motor enclosure.

12. A mid shield according to claim 10 wherein said enclosure engaging members each comprise at least one shield alignment bore formed therethrough, said shield alignment bores configured such that a connecting member can extend therethrough.

13. A mid shield according to claim 10 wherein said enclosure engaging members each comprise an end portion fabricated with a curvature substantially similar to an interior perimeter of the motor enclosure.

14. A mid shield according to claim 10 wherein said leg portions each comprise at least one reinforcement rib extending between said center section and a respective said enclosure engaging member.

15. A mid shield according to claim 10 wherein said center section comprises:
   a bearing bore substantially centered within said center section and extending partially therethrough; and
   a shaft bore concentric with and extending further therethrough than said bearing bore.

* * * * *